United States Patent [19]

Mayer et al.

[11] 4,063,231

[45] Dec. 13, 1977

[54] VISUAL DISPLAY APPARATUS

[75] Inventors: William Norman Mayer, White Bear Lake; Richard Karl Kirchner, Bloomington; Nicholas Cleanthis Andreadakis, White Bear Lake, all of Minn.

[73] Assignee: Modern Controls, Inc., Minneapolis, Minn.

[21] Appl. No.: 735,153

[22] Filed: Oct. 26, 1976

[51] Int. Cl.² .......................... G06F 3/14; H05B 41/02
[52] U.S. Cl. .............................. 340/324 M; 313/478; 315/169 TV; 340/168 S
[58] Field of Search ....... 340/324 R, 324 M, 166 EL, 340/168 S, 343; 313/478, 485; 315/169 TV; 358/213, 241

[56] References Cited

U.S. PATENT DOCUMENTS

| 3,848,248 | 11/1974 | MacIntyre, Jr. | 340/324 M |
| 3,875,473 | 4/1975 | Lebailly | 315/169 TV |
| 3,911,422 | 10/1975 | McDowell et al. | 315/169 TV |
| 3,952,221 | 4/1976 | Kamegawa et al. | 313/485 |

*Primary Examiner*—Marshall M. Curtis

[57] ABSTRACT

Apparatus for providing a visual display screen of the type formed from a plurality of gas cells wherein electrical voltages are capacitively coupled to selected cells to cause gas ignition and subsequent light emission, and wherein a preselected and repeatable pattern of color phosphor is deposited on selected cell surfaces in predetermined amounts to form a means for selecting any color and intensity combination over a wide range.

11 Claims, 4 Drawing Figures

COLOR INTENSITY LEVELS

| INTENSITY | ROW 1 | ROW 2 | ROW 3 |
|---|---|---|---|
| 0 | OFF | OFF | OFF |
| 1 | ON | OFF | OFF |
| 2 | OFF | ON | OFF |
| 3 | ON | ON | OFF |
| 4 | OFF | OFF | ON |
| 5 | ON | OFF | ON |
| 6 | OFF | ON | ON |
| 7 | ON | ON | ON |

VISUAL DISPLAY APPARATUS

BACKGROUND OF THE INVENTION

This invention relates to visual display screens wherein a plurality of gas cells are arranged across a plane in close capacitive proximity to electrical conductors, and the cells and conductors form a matrix of potential light emission sources. The matrix of light emission sources is further combined into groups of color zones, wherein phosphor patterns deposited on the screen enable any of a variety of colored lights to be displayed in each group.

This invention is an improvement over the invention entitled "Visual Information Screen" described in co-pending application, Ser. No. 706,071, filed July 16, 1976. The basic principles described in the copending application are utilized in the present invention by way of providing the basic light source matrix, and are incorporated by reference herein. The present invention represents an improvement in that it adds the capability for displaying color to the visual information screen which operates according to the principles disclosed previously.

SUMMARY OF THE INVENTION

The present invention utilizes a gas display panel having a plurality of gas cells formed by an X-Y matrix of conductors and gas channels, wherein the matrix is further subdivided into color-producing groups of cells. In the preferred embodiment a typical cell group comprises nine cells, each having a particular combination of phosphor type and quantity, wherein the phosphor types are respectively red, green and blue, and wherein the phosphor deposition quantities are respectively one unit, two units and four units. The selective energization of cells within a color group produce any of 512 color and intensity combinations.

BRIEF DESCRIPTION OF THE DRAWINGS

A preferred embodiment of the present invention is disclosed herein, with reference to the drawings in which.

DETAILED DESCRIPTION OF THE DRAWINGS

The present invention adds a color display and light intensity control feature to the devices known in the prior art. It is generally applicable to digital communications circuits in the same manner as prior art devices have found utility in these applications. The present invention is further applicable to display devices such as television display screens, wherein it may be used in conjunction with suitable electrical conversion circuits for transforming television analog signals into digital drive signals for energizing the matrix of cells. The invention may be used in conjunction with a digital computer processor for displaying alphanumeric or other information in full color and in variable intensities. In this application the apparatus is used in a manner comparable to prior art devices, with the additional parameters of color selection and intensity available for selective control by the computer processor. Since the prior art apparatus was controllable by computer processor, the present apparatus may be similarly controllable if the processor is properly programmed to accommodate the additional parameters of color selection and intensity.

Figure 1:
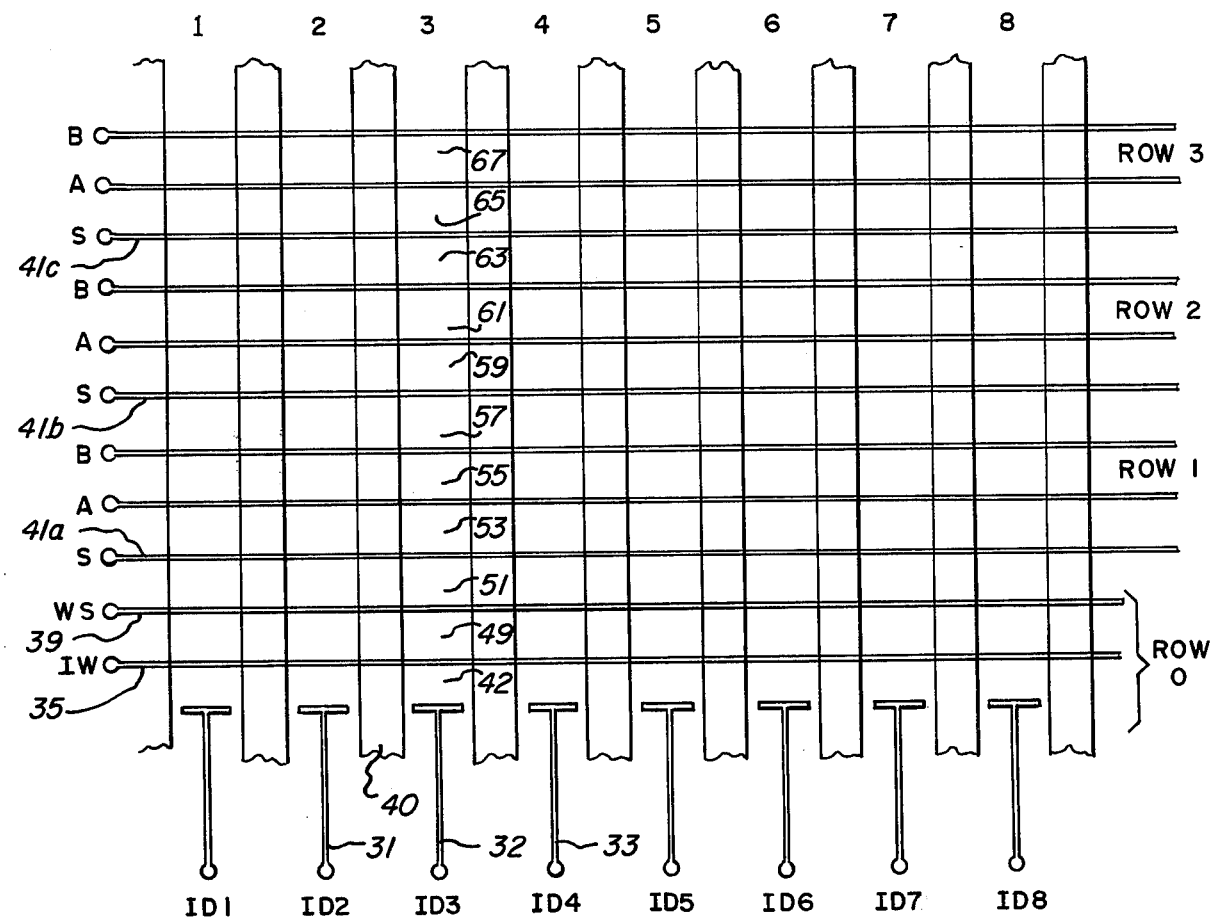
FIG. 1 is a simplified diagram showing the cell lines and rows.

FIG. 1 shows a simplified diagrammatic representation of a portion of the matrix of conductors and gas channels, wherein a gas cell is defined as the region between A and B conductors, and at the intersection of any particular gas channel. Twenty four such cell regions are shown on FIG. 1, and are defined as the points of intersection of lines 1 - 8 with rows 1 - 3, although any number of lines and rows may be constructed to create a larger matrix of cells.

An array of horizontal parallel conductors is arranged across a glass bottom plate and is separated from the perpendicular horizontal array of gas channels by a thin glass dielectric surface. Each of the conductors is identified by an electrical signal to which it is connected. For example, conductor 35 is an input word (IW) conductor, conductor 39 is a word select (WS) conductor and conductors 41a, 41b, 41c, etc. are step ahead (S) conductors. Conductors A and B are the conductor pair whose intermediate space defines the cell region which will be described in greater detail hereinafter. The electrical functions of these respective conductors are described in considerable detail in co-pending application Ser. No. 706,071 which is incorporated herein by reference.

The vertical gas channel lines are defined by the numerical line references 1–8 in FIG. 1, and each line physically relates to a gas-filled channel which is terminated at one of its ends by an input data (ID) conductor. Eight such lines are illustrated in FIG. 1, but it is to be understood that any number of lines, and any number of rows, may be constructed in a particular display panel application. The intersection of a line, such as line 3 (ID3) with each respective conductor pair A,B represents a gas cell position, and these cell positions can be correspondingly identified by a line and row location, or any other convenient means.

The detailed structure and operation of the apparatus of FIG. 1 has been described in the copending application, and will be therefore only summarized herein. Each of the vertical lines 1–8 are narrow gas channels wherein an inert gas such as neon is admitted, and becomes distributed evenly throughout the respective channels. The gas channels are separated by glass dividers, i.e. divider 40 between lines 2 and 3, so as to isolate an electrical discharge which occurs in any channel from spreading to an adjacent channel. A gas discharge is initially created by an electrical signal interaction between one or more of the ID conductors and the IW conductor 35. For example, a gas discharge may be created in gas region 42 by means of a properly sequenced application of voltages on conductor 35 and ID conductor 32. This discharge may be shifted into gas region 49 by a sequential application of voltages between conductors 35 and 39. Likewise, the gas discharge may be shifted through regions 51, 53, 55, etc. by the proper application of voltages in a timing sequence between respective adjacent conductors. A shifting of a gas discharge, or cell ignition, may be stopped in any gas region and maintained in that region by cyclically applying voltage signals between the conductors on either side of the region. For convenience, gas regions 55, 61, 67, etc. are defined as gas cells, for the conductors bounding these regions are labeled the A and B conductors respectively, and a cyclically applied voltage is impressed on these conductors whenever a gas discharge is not in the process of being shifted along the line. These areas have been designated row 1, row 2, etc. for identification purposes, and these designations will be maintained throughout the description of the invention.

Figures 2, 3:
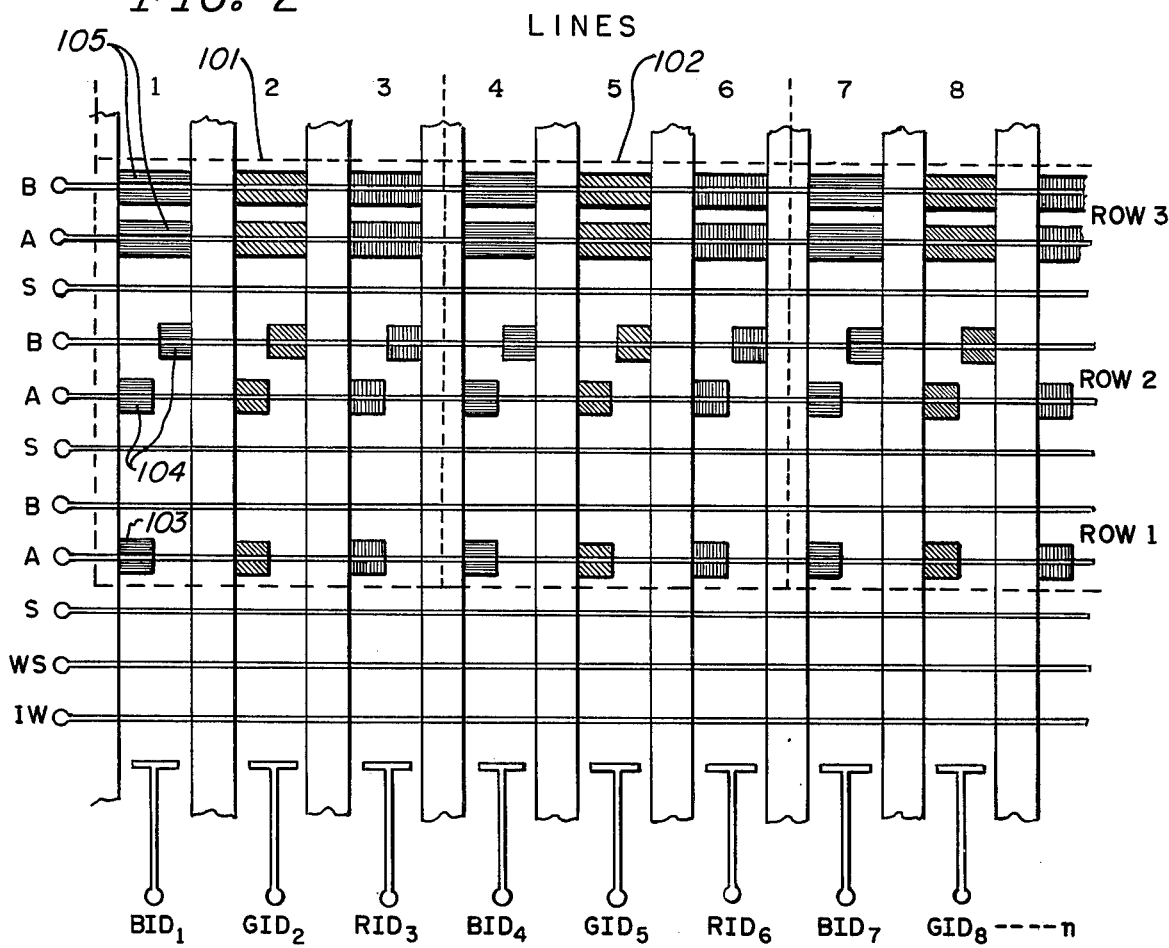
FIG. 2 diagramatically illustrates the cell color group.
FIG. 3 is a chart showing the intensity level variations within a given color phosphor.

FIG. 2 diagrammatically illustrates the present invention in combination with the apparatus illustrated in FIG. 1. The same gas channels and perpendicular conductor elements are utilized, and the entire apparatus is operated in a manner similar to that described hereinbefore. Individual gas cells are grouped into respective color groupings for the purpose of creating a larger cellular zone which has the capability of displaying variable color combinations with varying degrees of color intensity. For example, lines 1, 2 and 3 and rows 1, 2 and 3 define a matrix of nine gas cells, which are together grouped into a single color zone to form what will be hereinafter called a color cell. Therefore, a color cell consists of a 3×3 matrix of gas cells which will inherently occupy a larger physical space and when constructed into a gas display panel will result in a full color display panel having somewhat poorer cell resolution than the prior art apparatus.

In FIG. 2 dotted outline 101 defines a color cell, which color cell encompasses the nine gas cells formed by the intersection of lines 1, 2, 3 with rows 1, 2, 3. Dotted outline 102 similarly defines a second color cell formed from a matrix of nine gas cells. Any number of these color cells may be constructed from a single display panel by combining preselected numbers of gas cells into similar groupings. In the preferred embodiment a color cell has been chosen to encompass nine gas cells in order that a large combination of color selection choices may be made according to the teachings of the invention. However, other gas cell groupings could equally well be adopted to provide color cells of greater or lesser flexibility in terms of color selection and intensity level variance.

Each of the input data (ID) lines of FIG. 2 have a different numerical subscript to indicate that they may be respectively connected to different digital signal inputs. Every third ID line has the letter prefix B to indicate that it is associated with the color blue. Similarly, other ID lines are prefixed with the letter G and R to respectively indicate the colors green and red with which the particular lines are to be associated. For example lines 1, 4, 7, . . . are blue color lines associated with respective different color cells. Lines 2, 5, 8, . . . are green color lines associated with respective different color cells. Lines 3, 6, . . . are red color lines associated with different color cells in a similar manner. With respect to a particular color cell, for example cell 101, each of the three lines has three different color intensities associated along its cell length. For example, line 1 has a unit of blue phosphor indicated at 103 deposited on the cell panel in the region above one of the conductors, in this example conductor A at row 1. Line 1 has two units of blue phosphor 104 deposited on the panel surface above the adjacent conductor A-B at row 2, and has four units of blue phosphor 105 deposited on the panel above the next adjacent A-B conductor pair at row 3. Phosphor depositions 103, 104 and 105 represent multiples of a unit phosphor deposition, as for example where a single unit of deposition is equal to several micrograms of a particular blue phosphor. An example of a type of phosphor which is well suited for this application is calcium tungstate: PB, commonly known by the trade name Sylvania #2402. Line 2 has similarly weighted depositions of green phosphor in corresponding positions along the line. Line 3 has similarly weighted depositions of red phosphor at corresponding positions. For the respective row positions along each line, row 2 has twice the phosphor deposition weight of row 1, and row 3 has four times the phosphor deposition weight of row 1.

If the electrical signals to the panel are controlled so as to create and maintain a gas ignition in the cell region including deposition 103, then the cell will ignite with a blue collar intensity corresponding to the quantity of phosphor deposited at that location. If the panel signals are controlled so as to ignite the cell corresponding to phosphor deposition 104 the blue color intensity will be substantially twice the intensity associated with phosphor 103, because the phosphor deposition quantity is twice that of 103. If the panel signals are controlled so as to create a cell ignition in the region of phosphor deposition 105 the blue color intensity will be four times the intensity of deposition 103, because the quantity of blue phosphor at 105 is four times the quantity at 103. Therefore, color cell 101 has the capability of achieving a blue color intensity of one unit, two units, or four units, or by combining these cell ignitions any combination of one, two and four. Likewise, color cell 101 has a green and red intensity level selection having similar variation in intensity control. All other cells are similarly deposited with phosphor so as to create an entire color display panel having a plurality of color cells, each having a plurality of intensity levels associated with three colored phosphors. In any particular color cell there are therefore 512 different color and intensity combinations which may be preselected and sustained.

FIG. 3 illustrates a chart showing the eight possible intensity levels associated with a given color, and illustrates how each of these intensity levels may be obtained by selectively igniting or not igniting one of the respective three rows associated with the color cell. Color intensity level O corresponds to a color cell being in the "off" state, and other color intensity levels will result in varying degrees of brightness of the respective color.

Since each of the three lines in a color cell may be activated in any of eight color intensity levels, it follows that the combination of the three lines may produce any of 512 (8×8×8) color intensity combinations. This degree of color flexibility enables the panel to provide a full range of color scale representations to realistically create or reproduce any color image.

Since a color cell comprises a matrix of 3×3 gas cells it provides a somewhat poorer visual resolution than would be possible with a representation of a single gas cell. A single gas cell has a spot size of approximately $225 \times 10^{-6}$ square inches, and a matrix of 3×3 gas cells provides a spot size of approximately $2025 \times 10^{-6}$ square inches. By way of comparison, a color television screen commercially referred to as a 25-inch screen, provides a usable and discrete three-color spot size of approximately $3600 \times 10^{-6}$ square inches. Thus, the picture resolution of the present invention is somewhat better than the resolution obtainable on a commercial television screen.

Figure 4:
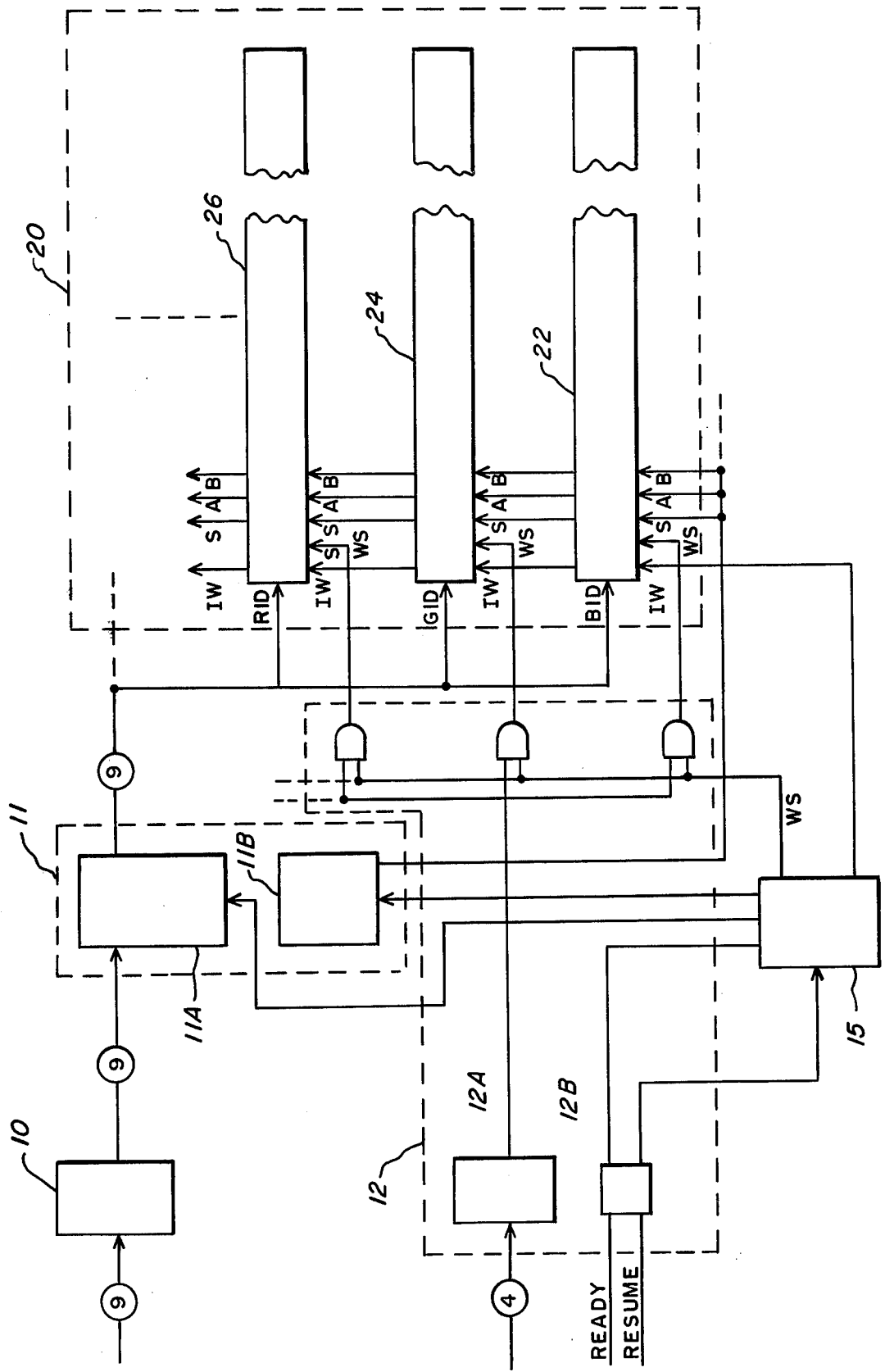
FIG. 4 is a block diagram showing signal interconnections to the apparatus.

FIG. 4 illustrates a block diagram showing the signal interconnections to the visual display apparatus of the present invention. The display screen 20 comprises a plurality of gas cell channels which may be arranged in any convenient combination for display purposes. By way of example, gas channels 22, 24 and 26 are shown receiving their respective color input data information over lines BID, GID, and RID respectively. The data representative of this color information is received over digital communications lines which feed into a buffer register 10. This register receives binary data and transmits it to a display drive control network 11 comprising a driver network 11A for coupling directly to the input data lines, and a timing control network 11B for generating timing signals to control the activation of conductors for shifting the data into the display panel. The activation of the display panel is controlled by external signals received through a control logic network 12, comprising an address register 12A for selecting one of the plurality of display panel lines and a ready-resume logic network 12B for controlling the overall timing of the display apparatus in conjunction with the external signal source. Ready-resume logic 12B in turn activates a timing circuit 15 which generates the necessary timing cycles, as described in the copending application previously referred to, so as to execute the necessary display panel driving cycles for either shifting or sustaining visual patterns on the display panel.

In operation, a binary digital word pattern is preferably preconstructed and stored in an external memory, which pattern corresponds to the ultimate display representation which will appear on display panel 20. In particular, a binary word pattern may correspond to a particular display panel line, in a one-for-one correspondence with the gas cells which are ignited to form the visual representation. Once the binary data has been preconstructed, it may be transmitted to buffer register 10 in some predetermined order in combination with appropriate display line addresses receivable by address register 12A. As the data is introduced over the selected display lines the timing logic 15 is activated and reactivated for shifting the data the appropriate number of display panel rows for proper positioning of the data on the display screen. Each display panel line is addressed and activated in this manner until the entire display panel has been activated to display the desired image. Timing logic 15 is designed so as to thereafter generate timing cycles for sustaining the display information without further shifting.

The foregoing process is repeated whenever new information is to be displayed on the screen. It is also repeated whenever information presently on the screen is to be modified in any way, for it becomes necessary to shift an entire new line of data whenever any single color cell in that line is to be modified. However, the electronic speeds at which this occurs are much faster than can be followed by the human eye, and visual examination of the screen would show an apparent immediate change to the whole screen rather than provide any visual sensation of data being shifted over the screen.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A visual display screen apparatus of the type having a matrix of selectable light cells wherein each cell contains an ignitable gas in close dielectric coupling with a voltage source, comprising:
   a. a plurality of groups of cells, each group subdivided into rows and perpendicular lines, the intersection of each of which comprises an ignitable gas cell and wherein adjacent cells along a line have respective different weights of color-emitting phosphor deposited therein, and wherein adjacent cells along a row have respective different color-emitting phosphors deposited therein; and
   b. means for selectively energizing any combination of said cells in each of the plurality of groups of cells.

2. The apparatus of claim 1, wherein the number of rows comprising a group of cells equals three, and wherein cells along each row respectively contain red, green and blue color-emitting phosphor.

3. The apparatus of claim 1, wherein the number of lines comprising a group of cells equals three, and wherein cells along each line respectively contain one unit, two units and four units of the same color-emitting phosphor deposition.

4. The apparatus of claim 1 wherein each group of further comprise nine cells arranged in a 3×3 cell matrix, each of said cells having a respective different combination of color-emitting phosphor type and weight deposition.

5. The apparatus of claim 4, wherein the color-emitting phosphor types are respectively blue, green and red.

6. The apparatus of claim 5, wherein the phosphor weight depositions are respectively proportioned as one unit, two units and four units of weight.

7. The apparatus of claim 6, further comprising means for electrically actuating and igniting a first cell in a line, and further means for shifting said cell ignition to an adjacent cell and thereby extinguishing said first-ignited cell.

8. In a color display apparatus constructed from a gas display panel having a plurality of gas cells arranged in a matrix whereby a plurality of color zone subsets are created from smaller cell matrices within the gas cell matrix, the improvement in color zone subsets comprising:
   a. parallel conductor inputs into said color zone subset matrix representative of different primary colors;
   b. a plurality of adjacent gas cells along a line extending from each parallel conductor input, said gas cells having deposited therein respective different quantities of color-emitting phosphor; and
   c. means for electrically igniting a first gas cell along said line, and further means for shifting said cell ignition into successive adjacent gas cells.

9. The improvement of claim 8, wherein the number of parallel conductor inputs comprise three inputs, each respectively associated with the colors blue, green and red.

10. The improvement of claim 9, wherein the plurality of adjacent gas cells along a line comprise three.

11. The improvement of claim 10, wherein the three gas cells along a line are respectively weighted with color-emitting phosphor quantities in the ratio of 1 : 2 : 4.

* * * * *